United States Patent
Fukunaga et al.

[11] Patent Number: 6,111,915
[45] Date of Patent: Aug. 29, 2000

[54] PICTURE DECODER

[75] Inventors: Shigeru Fukunaga; Toshihisa Nakai, both of Tokyo, Japan

[73] Assignee: Oki Electric Industry Co., Ltd., Tokyo, Japan

[21] Appl. No.: 08/987,590

[22] Filed: Dec. 9, 1997

[30] Foreign Application Priority Data

Mar. 24, 1997 [JP] Japan .................................. 9-069454

[51] Int. Cl.[7] ............................. H04N 7/12; H04N 11/02; H04N 11/04
[52] U.S. Cl. ........................... 375/240; 348/390; 348/409
[58] Field of Search ........................ 375/240.13, 240.14, 375/240.16, 240.17, 240.26, 240.29; 348/845.1, 845.2, 390, 409, 411, 416; H04N 7/12, 11/02, 11/04

[56] References Cited

U.S. PATENT DOCUMENTS

| | | | |
|---|---|---|---|
| 5,268,961 | 12/1993 | Ng ........................................ | 348/845.1 |
| 5,333,137 | 7/1994 | Fujiyama . | |
| 5,384,849 | 1/1995 | Jeong .................................... | 348/845.1 |
| 5,497,404 | 3/1996 | Grover et al. ........................ | 348/845.1 |
| 5,774,206 | 6/1998 | Wasserman et al. .................... | 348/416 |
| 6,038,000 | 3/2000 | Hurst, Jr. ............................... | 348/845 |

FOREIGN PATENT DOCUMENTS 0710 026 A2  5/1996  European Pat. Off. .
0763 944 A2  3/1997  European Pat. Off. .

OTHER PUBLICATIONS

Abstract of Japan, Publ. No. 04167862, Facsimile Equipment, published Jun. 15, 1992, Inventor N. Inoue; Applicant Fujitsu Ltd.
Abstract of Japan, Publ. No. 07250196, Image Storing Method of Facsimile Equipment, published Sep. 26, 1995; Inventor O. Suzuki; Applicant Ricoh Co. Ltd.
Error Resilient Video Coding by Dynamic Replacing of Reference Pictures, S. Fukunaga et al. Kansai Lab, R&D Group, Oki Electric Ind. Co., Ltd.; IEEE Globecom, vol. 3/3 Nov. 1996, pp. 1503–1508, XP002057182.
Video Coding for Low Bitrate Communication, International Telecommunication Union, Dec. 5, 1995.

*Primary Examiner*—Howard Britton
*Assistant Examiner*—Nhon T Diep
*Attorney, Agent, or Firm*—Rabin & Champagne, PC

[57] ABSTRACT

A picture decoder decodes P frames without having to wait for a next I frame even if a data loss occurs, and ensures quick recovery from degraded picture quality. The picture decoder sends decoding status information on received coded data to a coder. This makes it possible for the picture coder to perform coding using a frame, successfully decoded by the decoder, as a reference frame. Also, the picture decoder according to the present invention saves in frame memory a frame that is likely to be used as the reference frame, decreasing a probability that received coded data cannot be decoded because there is no reference picture in frame memory and thus increasing coding efficiency. This also keeps the reference frame memory size of the picture decoder to a minimum.

4 Claims, 5 Drawing Sheets

I FRAME   P FRAME

DATA LOSS   CANNOT BE DECODED CORRECTLY

PICTURE DECODER

BACKGROUND OF THE INVENTION

1. Field of the Invention

The present invention relates to a picture decoder, and more particularly to an improvement in picture quality degraded by a data error or a data loss caused during picture data transmission.

2. Description of the Prior Art

Recently, standardization of picture coding methods has been under way, with the implementation of moving-picture transmission systems in mind. Those systems include a videotelephone, videoconferencing, and video-on-demand (VOD). ITU-T Recommendation H.263 and MPEG (Moving Picture Experts Group) are well known as international standardization standards.

For example, the coding method adopted by the ITU-T Recommendation H.263, shown in FIG. 2, performs intra-frame coding on time-sequenced frames (I frames a and i) at regular intervals and, at other times, performs inter-frame coding for each of P frames (inter-frame coded frames, b–h, j–k) with reference to the immediately preceding frame to remove temporal redundancy. In the following discussion, a frame coded in the intra-frame coding method is referred to as an I frame, while a frame coded in the inter-frame coding method is referred to as a P frame.

This technology is described in "Standardization of Multimedia Coding" by Hiroshi Yasuda, pp. 84–97, Maruzen, (1991).

The method proposed by Recommendation H.263, which performs the inter-frame coding of each frame by referencing the immediately preceding frame, requires that all the frames be transmitted in the correct sequence. For a telephone line or an ISDN line over which data is transmitted after a connection with a partner is established, data reaches the partner without loss and in the correct sequence.

However, for an Ethernet LAN or an ATM network in which data is divided into small units (called packets or cells) before it is transmitted, there is a possibility that packets are lost or transmitted in an incorrect sequence.

In general, networks employ a protocol (for example, TCP: Transmission Control Protocol) in which the transmitting device sends packets with attached serial numbers, and the receiving device rearranges the packets in the correct sequence, confirms their arrival, and sends requests for the retransmission of non-arriving packets back to the transmitting device in order to deal with these problems and increase network reliability.

However, when network operation is unstable and packets are dropped frequently, retransmission under this type of protocol can cause large cumulative delays to build up, which is inappropriate for the real-time transmission of moving pictures. In some cases, it is preferable to display new data, even if that means skipping a frame, rather than retransmitting old data, especially when new data can be displayed immediately.

Broadcasting and multicasting are schemes which send data to a plurality of sites at a time. However, when packet dropout occurs during transmission of a packet to one of the sites, the above protocol requires that the same packet be sent even to those sites which have received the packet successfully, significantly increasing the network load.

Broadcasting and multicasting are therefore performed using a protocol that does not re-transmit a packet, such as the User Datagram Protocol (UDP); as a result, the probability of packet dropout increases.

In wireless networks, the data error rate or data drop-out rate is high not only when data is sent in packets but when a line connection is established before data is sent. In addition, when the errors exceed the error-correcting capability of the receiving device, a sequence of data items are sometimes discarded to receive some other part of data successfully. Data dropouts in wireless networks therefore tend to be larger than in wireline networks.

Another problem is that the processing speed of the sending device is not always equal to that of the receiving device. For example, decoding all the frames on a slower receiving device would put much of the frame data in the wait state, causing long delays. This requires the receiving device to intentionally skip frames. However, when there is no decoding data for a frame preceding the current frame, as in the inter-frame coding method according to the prior art, the current frame cannot be decoded and therefore frames cannot be skipped as intended.

FIG. 3 shows an example of frame dropout that may occur during transmission of frames. When frame e is dropped out or cannot be decoded because of slow processing, the P frames (f, g, h) cannot be decoded until the next I frame, i, is received.

Thus, in order to send all the frames successfully in a network in which frame dropout or frame skipping occurs frequently, intra-frame coding for all the frames is more efficient. However, the problems with this method, which does not use inter-frame coding, are that there is temporal redundancy and that data transmission efficiency is degraded.

Thus, to successfully transmit moving-picture data over a network in which a data dropout occurs frequently, there has been a long felt need for a picture coding system which ensures high coding efficiency and quick recovery from degraded picture quality.

SUMMARY OF THE INVENTION

To solve the above problems, a picture decoder according to the present invention includes: receiving means for receiving coded data coded through predictive coding and a frame number (or frame number and block number) of a reference picture over a transmission line; decoding means for decoding the coded data using the reference picture indicated by the reference frame number (or frame number and block number), the coded data being received by the receiving means; and decoding status signal transmitting means for outputting a decoding status signal indicating a decoding result of each piece of coded data decoded by the decoding means and the frame number (or frame number and block number) associated with the coded data to a picture coder. The picture decoder comprises the following:

That is, the picture decoder comprises reference frame selecting and deleting means which saves an oldest frame (or block) other than the last reference frame in frame memory.

In addition, the picture coder according to the present invention comprises coding means which codes input picture data through predictive coding based on the reference picture, one frame at a time, transmitting means which transmits data coded by the coding means and the frame number (or frame number of block number) of the reference picture to the picture decoder, and reference picture updating means which controls the update of the reference picture based on a decoding status signal and the frame number (or frame number and block number) sent from the picture decoder.

BRIEF DESCRIPTION OF THE DRAWINGS

The present invention will be understood more fully from the detailed description and the accompanying drawings below of the preferred embodiments of the invention.

In the drawings.

DESCRIPTION OF THE PREFERRED EMBODIMENTS (A) First embodiment

Referring to the attached drawings, there is shown a configuration, operation, and effect of a moving-picture decoder (receiving device) used in the first embodiment.

The moving-picture decoder according to the present invention updates a reference picture on a frame basis or on a block basis, where a block is one partition of a frame. When picture data is processed on a frame basis, a decoding status signal is returned and the reference picture is updated each time a frame is updated; when picture data is processed on a block basis, the decoding status signal is returned and the reference picture is updated each time a block is updated. The processing and configuration described below apply to frames and blocks, although only frames are mentioned in some part of the description.

The picture decoder (receiving device) in the first embodiment is characterized in that the decoder saves in the frame memory the last frame (or block) used as the reference picture (hereinafter called last reference frame).

Figure 1:
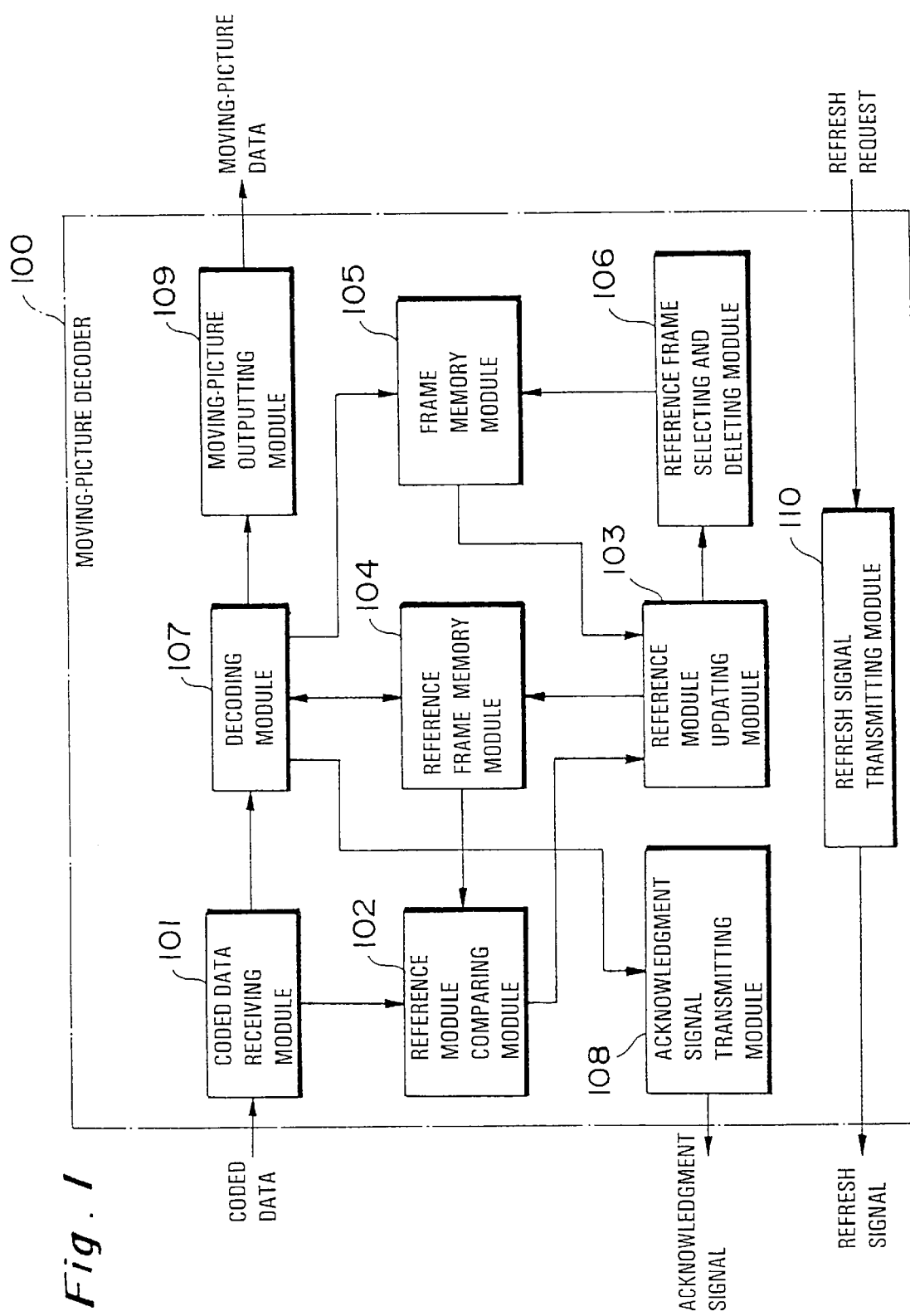
FIG. 1 is a block diagram showing an example of a functional configuration of a picture decoder (receiving device) used in a first embodiment.
Figure 2:
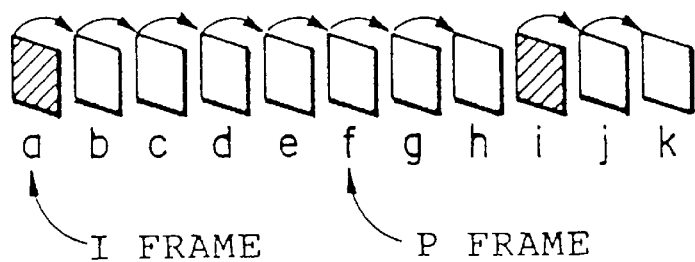
FIG. 2 is a conceptual diagram showing conventional coding.
Figure 3:
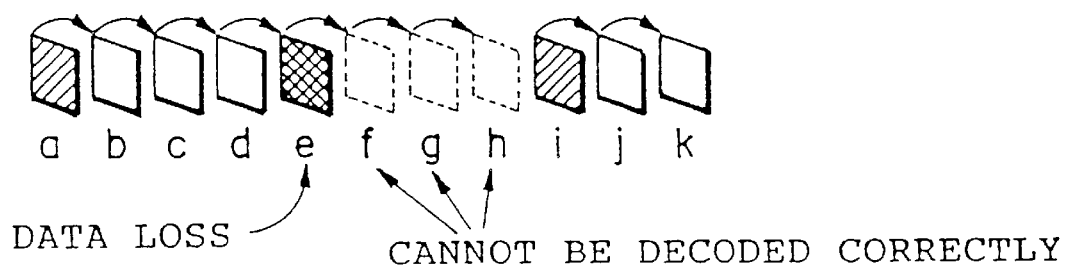
FIG. 3 is a conceptual diagram showing an example of coding when a transmission error occurs in a conventional system.

A functional configuration of the moving-picture decoder (receiving device) used in the first embodiment is shown in FIG. 1.

As shown in FIG. 1, a moving-picture decoder (receiving device) 100 comprises a coded data receiving module 101, a reference frame comparing module 102, a reference frame updating module 103, a reference frame memory module 104, a frame memory module 105, a reference frame selecting and deleting module 106, a decoding module 107, a acknowledgment signal transmitting module 108, a moving-picture outputting module 109, and a refresh signal transmitting module 110.

The coded data receiving module 101 receives coded moving-picture data from the sending moving-picture coder. The module passes received coded data as well as data multiplexed on the coded data, such as an intra-/inter-frame coding identifier and a reference frame number, to the decoding module 107; it also sends sending device information, multiplexed as necessary on the coded data, to the decoding module 107. The coded data receiving module 101 also passes the reference frame number to the reference frame comparing module 102.

The reference frame comparing module 102 compares the reference frame number contained each received frame (or block) with the reference frame number stored in the reference frame memory module 104. If two reference frame numbers mismatch, the reference frame comparing module 102 sends a reference frame update request to the reference frame updating module 103 and passes a new reference frame number to it.

The reference frame updating module 103, upon receiving an update request from the reference frame comparing module 102, reads frame data (or block data) associated with the new reference frame number from the frame memory module 105, and writes the frame number and frame data into the reference frame memory module 104 for updating. The reference frame updating module 103 also passes the reference frame number to the reference frame selecting and deleting module 106.

The reference frame memory module 104 is a memory medium, such as a memory circuit, which memorizes reference frame data for use in inter-frame decoding. This module is updated by the reference frame updating module 103 and the decoding module 107.

The frame memory module 105 is a medium such as a memory circuit containing decoded frame data (or block data). Data of a frame (or block) decoded by the decoding module 107 is written into the frame memory module 105; the data is deleted as necessary by the reference frame selecting and deleting module 106. The frame memory module 105 also keeps track of which frame (or block) is the last reference frame.

The reference frame selecting and deleting module 106 saves the last reference frame in the frame memory module 105. That is, the module maintains the last reference frame based on the reference frame number received from the reference frame updating module 103, and deletes frames (or blocks) earlier than the last reference frame from the frame memory module 105. The last reference frame is not cleared until updated.

The decoding module 107 decodes received coded data and sends resulting decoded data to the moving-picture outputting module 109. For an I frame, the decoding module 107 writes decoded data and the frame number into the reference frame memory module 104 and the frame memory module 105 to update the reference frame picture; for a P frame, the module decodes data by referencing data stored in the reference frame memory module 104 and writes decoded data and the frame number into the frame memory module 105. If a transmission error is detected by using CRC or if the picture data cannot be decoded because no reference frame data is stored in the reference frame memory module 104, the decoding module 107 does not write data into the reference frame memory module 104 and the frame memory module 105.

The acknowledgment signal transmitting module 108 sends the acknowledgment signal to the moving-picture coder (sending device) to inform it of the frame which has been decoded successfully.

The moving-picture outputting module 109 outputs decoded data received from the decoding module 107 to a display monitor device.

The refresh signal transmitting module 110, upon receiving a refresh request from a user, sends a refresh signal to the moving-picture coder (sending device).

Next, the operation of the picture decoder (receiving device) used in the first embodiment is described.

Figure 4:
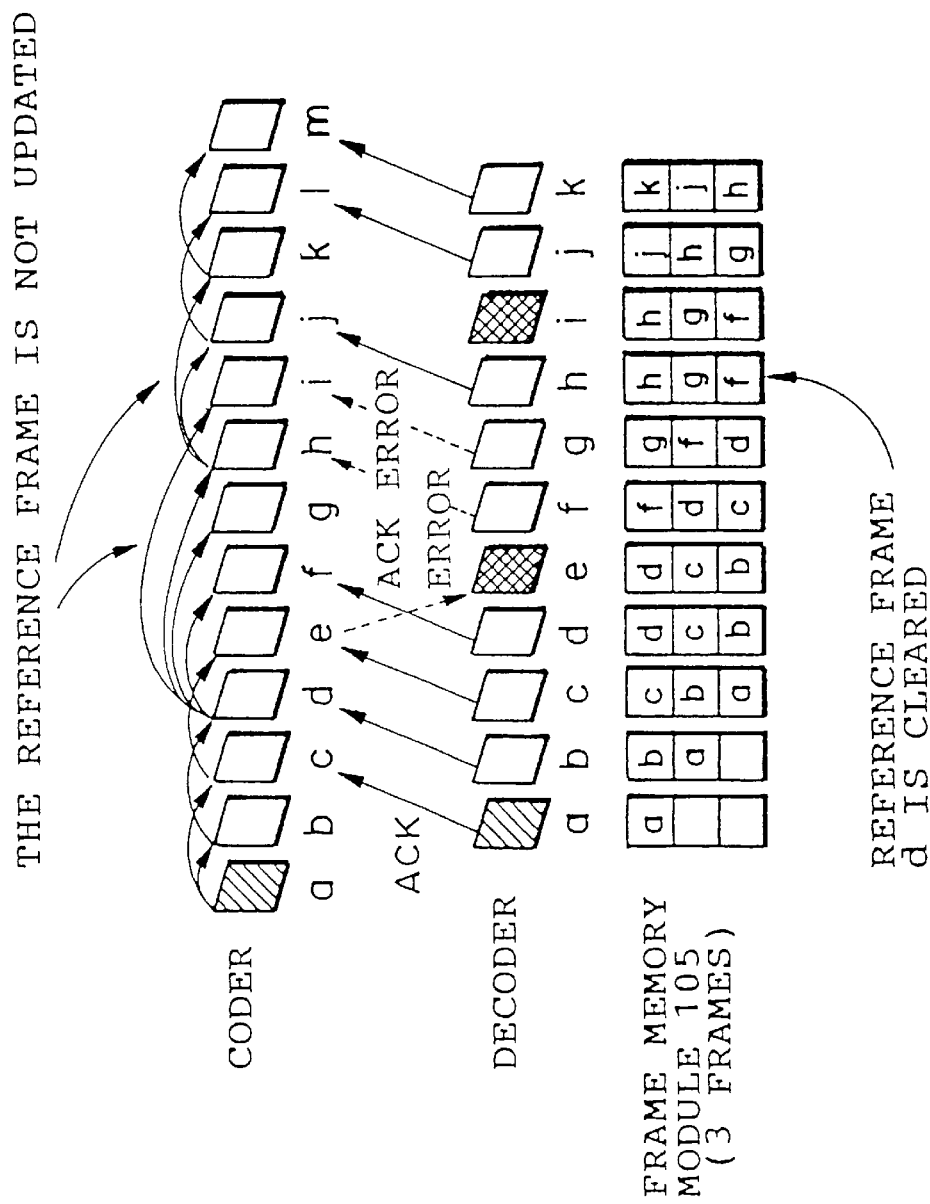
FIG. 4 is a conceptual diagram showing an example of operation when a reference frame selection and deletion means is not used in the first embodiment shown in FIG. 1.

FIG. 4 shows the reference frame update method executed in response to the acknowledgment signal (ACK) when the reference frame selecting and deleting module 106 is not used. Assume that the frame memory module 105 contains three frames.

Successfully-decoded frames (a, b, c, d) are stored in the frame memory module 105. When the frame memory module 105 is full, the oldest frame is cleared and then a new frame is added. For example, when frame d is stored, frame a is cleared. Instead of clearing frame a, frame d may be overwritten directly on frame a. When a transmission error or a decoding error occurs, the frame is not stored in the frame memory module 105.

When the reference frame selecting and deleting module 106 is not used, continuous acknowledgment signal errors cause a problem. That is, if frames f and g are successfully decoded and are stored in the frame memory module 105 but if the acknowledgment signal (ACK) which should be returned to the moving-picture coder is not returned continuously, frames f and g are not used as reference frames.

The next frame, h, is also decoded successfully and is stored in the frame memory module 105. At this time, however, frame d is cleared. Therefore, the next frame, i, which is received successfully, cannot be decoded because the reference frame d has already been cleared from the frame memory module 105.

As described above, continuous decoding status signal errors may clear a necessary reference frame, decreasing coding efficiency.

Figure 5:
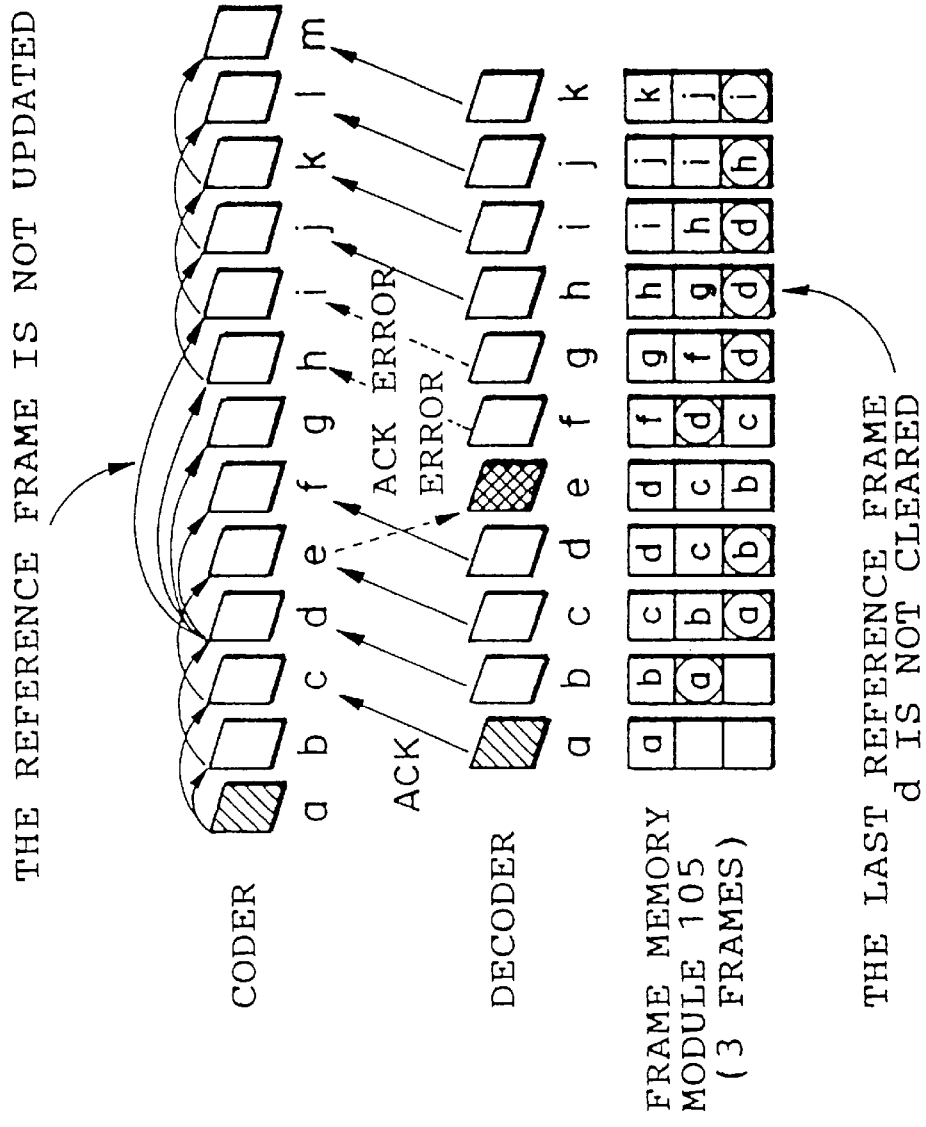
FIG. 5 is a conceptual diagram (1) showing an example of operation when a reference frame selection and deletion means is used in the first embodiment shown in FIG. 1.

FIG. 5 shows the reference frame update method executed in response to the acknowledgment signal (ACK) when the reference frame selecting and deleting module 106 is used. Assume that the frame memory module 105 contains three frames.

Successfully-decoded frames (a, b, c, d) are stored in the frame memory module 105. At this time, the last reference frame is managed using a flag or a pointer. In FIG. 5, the number of a frame used as the last reference frame is circled.

When a new frame is added to the frame memory module 105 that is full, the oldest frame other than the last reference frame is cleared and then a new frame is added. For example, when frame d is stored, frame a is cleared. Instead of clearing frame a, frame d may be overwritten directly on frame a.

Frame e on which a transmission error or a decoding error occurred is not stored in the frame memory module 105. In addition, when a decoding error occurred, the last reference frame is temporarily nullified. In FIG. 5, a circle is cleared at the time frame e is processed. This is because, when a decoding error occurs, it cannot be determined whether or not the last reference frame b should be kept in frame memory module 105. Note that no problem will develop even if frame b is kept in frame memory module 105 as the last reference frame.

Nor will a problem develop even if the acknowledgment signal (ACK) error occurs continuously. Frames f and g, which are decoded successfully, are stored in the frame memory module 105. However, they are not used as the reference frame, because the acknowledgment signal (ACK) could be sent back to the moving-picture coder because of an error. During this period, frame d which is used as the reference frame is kept in the frame memory module 105. This allows frames h and i to be decoded successfully.

Figure 6:
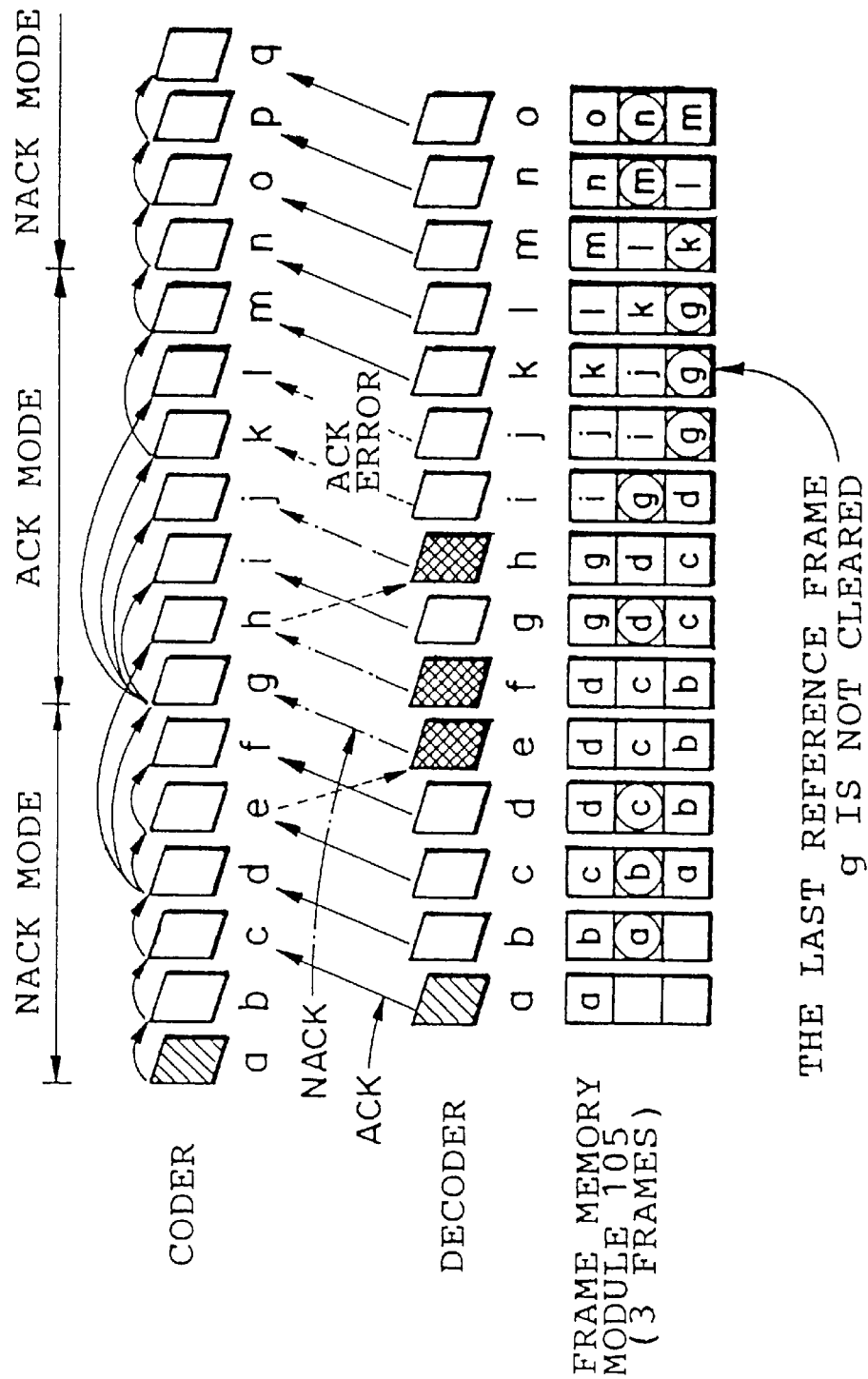
FIG. 6 is a conceptual diagram (2) showing an example of operation when a reference frame selection and deletion means is used in the first embodiment shown in FIG. 1.

FIG. 6 shows the reference frame update method executed in response to both the acknowledgment signal (ACK) and the negative acknowledgment signal (NACK) when the reference frame selecting and deleting module 106 of the first embodiment is used. Assume that the frame memory module 105 may contain up to three frames.

Frames a–d and frames k and the following are processed in response to the NACK signal, while frame e–j are processed in response to the ACK signal. In FIG. 6, the coder is switched to the ACK mode when it receives the NACK signal or receives neither of the signals, and is switched to the NACK mode when it receives two continuous ACK signals.

Successfully-decoded frames are stored in the frame memory module 105 and the last reference frame is managed as in the example in which the coder performs processing in response to the acknowledgment signal (ACK). Frames e and h on which a transmission error occurred or frame f which could not be decoded because there was no reference frame are not stored in the frame memory module 105, and the last reference frame is nullified temporarily.

Even if an acknowledgment signal (ACK) error occurs continuously, no problem develops. Frames i and j, which are decoded successfully, are stored in the frame memory module 105. However, they are not used as the reference frame, because the acknowledgment signal (ACK) could not be sent back to the moving-picture coder because of an error. During this period, frame g which is used as the last reference frame is kept in the frame memory module 105. This allows frames k and l to be decoded successfully, enabling the NACK mode.

As described above, the last reference frame (or block) is kept in the frame memory module 105. Thus, even when a decoding status signal error occurs continuously, there is little probability that the necessary reference frame is cleared and therefore coding efficiency is increased.

In addition, the decoder used in this embodiment stores only necessary frames (or blocks) in memory, keeping the reference frame memory size to a minimum.

Variations of the first embodiment

In FIG. 1, the reference frame memory module 104 and the frame memory module 105 are separate modules. This configuration is not always required. Frame data may be stored in a memory module, with the reference frame being pointed to by a pointer. This configuration eliminates the need for copying data from the frame memory module 105 to the reference frame memory module 104 during reference frame update; simply moving the pointer points to the reference frame, thereby making the circuit configuration simple.

(B) Other embodiments (1) The moving-picture decoder in each of the above embodiments may be implemented as a hardware unit or a software program.

(2) In each of the above embodiments, transmission data is moving-picture data. Transmission data may be voice data or binary data.

The picture decoder according to the present invention saves in memory a frame (or block) that is likely to be used as the reference frame, decreasing the probability that received coded data cannot be decoded because there is no reference picture and thus increasing coding efficiency.

In addition, storing only necessary frames (or blocks) in memory minimizes the reference frame memory size of the picture decoder.

The picture decoder which controls the reference frame memory eficiently decreases the probability of necessary frames (or blocks) being cleared and increases coding efficiency.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A picture decoder which includes a receiver receiving coded data coded through predictive coding and a reference frame number of a reference frame used in the predictive coding over a transmission line; a decoder decoding the coded data using frame data indicated by the reference frame number, the coded data being received by the receiver; and a decoding status signal transmitter outputting a decoding status signal indicating a decoding result of each piece of coded data decoded by the decoder and the frame number associated with the coded data to a picture coder, the picture decoder comprising:

a frame data store concurrently storing a plurality of frame data pieces successfully decoded by the decoder and managing a last frame out of at least one frame used previously as the reference frame as a last reference frame, said plurality of concurrently stored frame data pieces including a frame data piece which is decoded by the decoder and made available for use as a reference frame except when an error is indicated by said decoding status signal; and a reference frame selecting and deleting module selecting and deleting an oldest frame other than the last reference frame when a need arises to delete frame data from the frame data store.

2. The picture decoder according to claim 1, wherein said frame data store manages said last frame as said last reference frame by using a pointer to point to said last frame among said plurality of concurrently stored frame data pieces.

3. A picture decoder which includes a receiver receiving, on a block basis, coded data coded through predictive coding and a reference frame number of a reference frame and a block number used in the predictive coding over a transmission line, a frame being divided into a plurality of blocks; a decoder decoding the coded data using block data indicated by the reference frame number and the block number, the coded data being received by the receiver; and a decoding status signal transmitter outputting a decoding status signal indicating a decoding result of each piece of coded data decoded by the decoder and the frame number and the block number associated with the coded data to a picture coder, the picture decoder comprising:

a frame data store continually storing, on a block basis, a plurality of frame data pieces successfully decoded by the decoding means and managing, on a block basis, a last frame out of at least one frame used previously as the reference frame as a last reference frame, said plurality of concurrently stored frame data pieces including a block of one or more frame data pieces which is decoded by the decoder and made available for use as a reference frame except when an error is indicated by said decoding status signal; and a reference frame selecting and deleting module selecting and deleting, on a block basis, the block of an oldest frame other than the last reference frame when a need arises to delete frame data from the frame data store.

4. The picture decoder according to claim 3, wherein said frame data store manages said last frame as said last reference frame by using a pointer to point to a block including said last frame among stored blocks of said plurality of concurrently stored frame data pieces.

* * * * *